(12) United States Patent
Burklin et al.

(10) Patent No.: US 7,590,416 B1
(45) Date of Patent: Sep. 15, 2009

(54) METHOD FOR MANAGING BANDWIDTH IN A COMMUNICATION NETWORK COMPRISING A CORDLESS CONNECTION

(75) Inventors: Helmut Burklin, Rennes (FR); Yvon Legallais, Rennes (FR); Gilles Straub, Acigne (FR)

(73) Assignee: Thomson Licensing, Boulogne Billancourt (FR)

( * ) Notice: Subject to any disclaimer, the term of this patent is extended or adjusted under 35 U.S.C. 154(b) by 0 days.

(21) Appl. No.: 09/856,063

(22) PCT Filed: Nov. 22, 1999

(86) PCT No.: PCT/FR99/02863

§ 371 (c)(1),
(2), (4) Date: Jul. 12, 2001

(87) PCT Pub. No.: WO00/31911

PCT Pub. Date: Jun. 2, 2000

(30) Foreign Application Priority Data

Nov. 25, 1998 (FR) .................................... 98 14852

(51) Int. Cl.
*H04W 40/00* (2009.01)
(52) U.S. Cl. ....................... 455/428; 370/338
(58) Field of Classification Search .............. 455/524, 455/507, 428; 710/314, 316; 709/219; 370/392, 370/395.52, 401, 466, 352, 338, 409, 465, 370/328, 329
See application file for complete search history.

(56) References Cited

U.S. PATENT DOCUMENTS 6,286,071 B1 * 9/2001 Iijima ......................... 710/124
6,751,221 B1 * 6/2004 Saito et al. .................. 370/392

2002/0012358 A1 * 1/2002 Sato ............................ 370/466

OTHER PUBLICATIONS

IEEE 1394.1 Bridge Standards Meeting/ Talk Title:1394 Wireless Bridge wwith Virtual Bus, Takashi Sato.*
Kazunobu Toguchi et al, "Reservation of Bridge Resources", Proposal for Jan. 26 P1394.1 working group, Extract from Internet.
Sugita/Hiraiwa/Akahane, "Proposals in Consideration of Wireless Bridge Fabric" Extract from Internet, Mar. 1998 p. 2-10.
Takashi Sato, "1394 Wireless Bridge with Virtual Bus" Extract fro Internet, Jun. 1998.
Sponsor: Microprocessor and microcomputer Standards Committee of the IEEE Computer Society "P1394.1 Draft Standard for High Performance Serial Bus Bridges", Extract from Internet, Oct. 18, 1998.
IEEE p1394.1 Working Group Minutes. Jan. 26, 1998 Extract from Internet, p. 2, lines 8-31.
"High Performance Serial Bus Bridges Minutes of the Jun. 9-10 meeting IEEE P1394 Working Group", Extract from Internet, pp. 3 and 5, lines 9-10.
R.H.J. Bloks "The IEEE-1394 High Speed Serial Bus" Philips Journa of Research, vol. 50, No. ½, Jul. 1, 1996, pp. 209-216.

* cited by examiner

*Primary Examiner*—Tu X Nguyen
(74) *Attorney, Agent, or Firm*—Robert D. Shedd; Paul P. Kiel

(57) ABSTRACT

The invention relates to a process for managing resources in a communication network comprising at least two communication buses linked by way of a wireless transmission bridge, the said bridge comprising for each bus a real portal connected to this bus, each portal being furnished with wireless communication means. The process is characterized by the steps:
modelling the said wireless bridge by each real portal in the form of virtual buses and virtual bridges, each virtual bridge comprising two virtual portals;
emulating a global register of passband availability for the entire wireless bridge;
reserving passband with the said global register for each wireless link participating in a communication.

The invention applies in particular in field of home automation.

13 Claims, 10 Drawing Sheets

METHOD FOR MANAGING BANDWIDTH IN A COMMUNICATION NETWORK COMPRISING A CORDLESS CONNECTION

This application claims the benefit of French application no. 9814852 filed Nov. 25, 1998, which is hereby incorporated herein by reference, and which claims the benefit under 35 U.S.C. § 365 of International Application PCT/FR99/02863, filed Nov. 22, 1999, which was published in accordance with PCT Article 21(2) on Jun. 2, 2000.

The IEEE 1394 1995 standard relates to the configuration and management of one or more serial communication buses. Work is in progress to produce an extension of this standard covering networks made up of several buses interconnected by way of assemblies referred to as 'bridges'. This extension, termed P1394.1, currently exists in the form of a preliminary draft of version 0.03, dated October 1997. According to this draft, a bridge is made up of a pair of devices referred to as portals, each of the two portals being connected to one out of two buses to be linked. The two portals are linked to one another by a switching matrix (or 'switching fabric'). The specification of the switching matrix of the bridge is outside the framework of P1394.1 and is left to the implementer to deal with. Currently, no bridges possessing more than two portals are provided for, given that it is possible to model any connection of more than two buses by a limited number of bridges connecting pairs of buses only.

The interconnecting of several buses as mentioned in the above paragraph can also be performed by way of wireless links, for example by radio frequency (RF) transmission. FIG. 1 is an example of a wireless bridge between four 1394 buses. Each of the buses 1 to 4 is linked to a portal of the bridge, the portals being identified by the letters A to D. The bridge of FIG. 1 is an example of incomplete connectivity in the sense that the bridge comprises at least one portal which cannot communicate directly with another portal. Within the framework of the example, there is no direct link between the portals A and D.

The IEEE 1394 1995 standard describes an isochronous transmission procedure, in which an apparatus ('node') wishing to transmit data first makes a reservation of a certain number of isochronous channels. One of the nodes of the bus possesses the 'BANDWIDTH_AVAILABLE' and 'CHANNEL_AVAILABLE'. A node makes a reservation for isochronous resources with the manager of isochronous resources by reading the registers and by updating their content according to its requirements.

The reservation process described in the document IEEE 1394 1995 is not however suited to the network of buses connected by a wireless bridge such as that of FIG. 1. Specifically, if the portal A has to perform a transmission of passband of width X to the portal D, a passband of width 2X will be required in total: the portal A must reserve a first passband of width X for the transmission from A to, for example, C, then a second passband of width X for the transmission from C to D. Stated otherwise, the passband depends on the connectivity existing in the network: this type of configuration is not taken into account by the current IEEE 1394 1995 standard.

The document 'P1394.1 Draft Standard for High Performance Serial Bus Bridges—Draft 0.03 Oct. 18, 1997' defines a bridge between two communication buses, the bridge consisting of two portals.

The document "Reservation of bridge resources proposal for January 26 p1394.1 working group" by K. Toguchi et al., January 1998 also relates to a bridge with two portals.

The document "Proposals in consideration of wireless bridge fabric" by Sugita et al., March 1998 relates to bridges with more than two portals.

The subject of the invention is a process for managing isochronous resources in a communication network comprising at least two communication buses linked by way of a wireless transmission bridge, the said bridge comprising for each bus a real portal connected to this bus, each portal being furnished with wireless communication means, characterized in that the said process comprises the steps of:

modelling the said wireless bridge by each real portal in the form of virtual buses and virtual bridges, each virtual bridge comprising two virtual portals;

emulating a global register of passband availability for the set of wireless links of the wireless bridge;

reserving passband with the said global register for the virtual buses representing each wireless link participating in a communication between two real portals.

The centralizing of the global register of passband availability function into a single register for all the modelled buses of the wireless bridge makes it possible to make passband reservations globally for this wireless bridge. By transmitting passband reservation requests received on modelled buses to this single register, the centralizing of the function is made transparent to a node making the reservation.

Other characteristics and advantages of the invention will become apparent through the description of two particular non-limiting exemplary embodiments described with the aid of the appended figures among which:

French Patent Application 98 04982 of 21 Apr. 1998 filed in the name of THOMSON multimedia and bearing the title 'Procédé de synchronisation dans un réseau de communication sans fil' [Process of synchronization in a wireless communication network] also relates to a wireless bridge linking several communication buses, in particular of the IEEE 1394

1995 type. This patent application constitutes the priority application of PCT application WO99/55028, published on 28, Oct. 1999 and may be consulted in the public dossier for the latter application.

According to a first exemplary embodiment, a decomposition of a multi-portal bridge into a given number of bi-portal bridges is carried out by representing a connection between two portals by a virtual bus.

Figure 1:
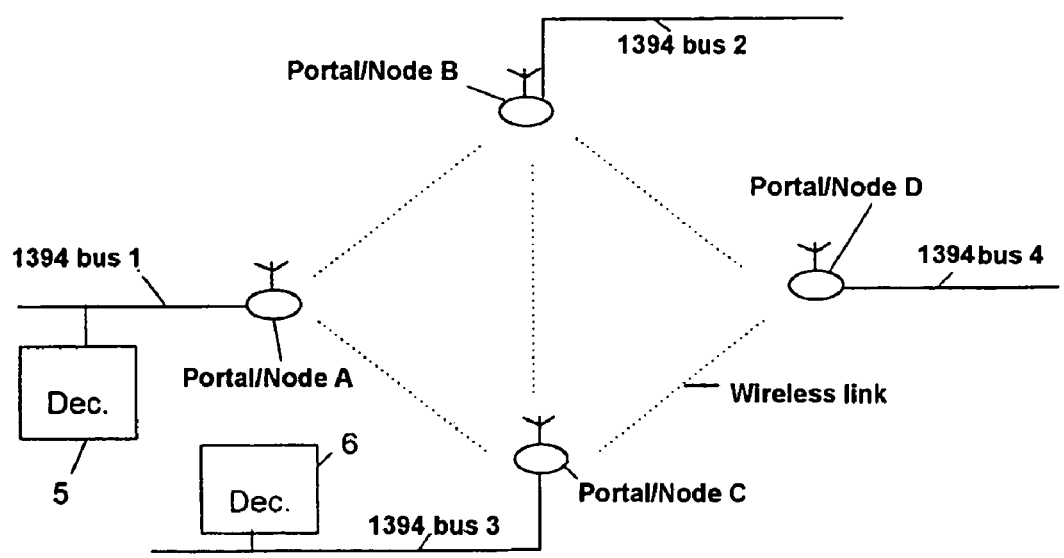
FIG. 1 is a diagram representing a wireless bridge between several buses.
Figure 2:
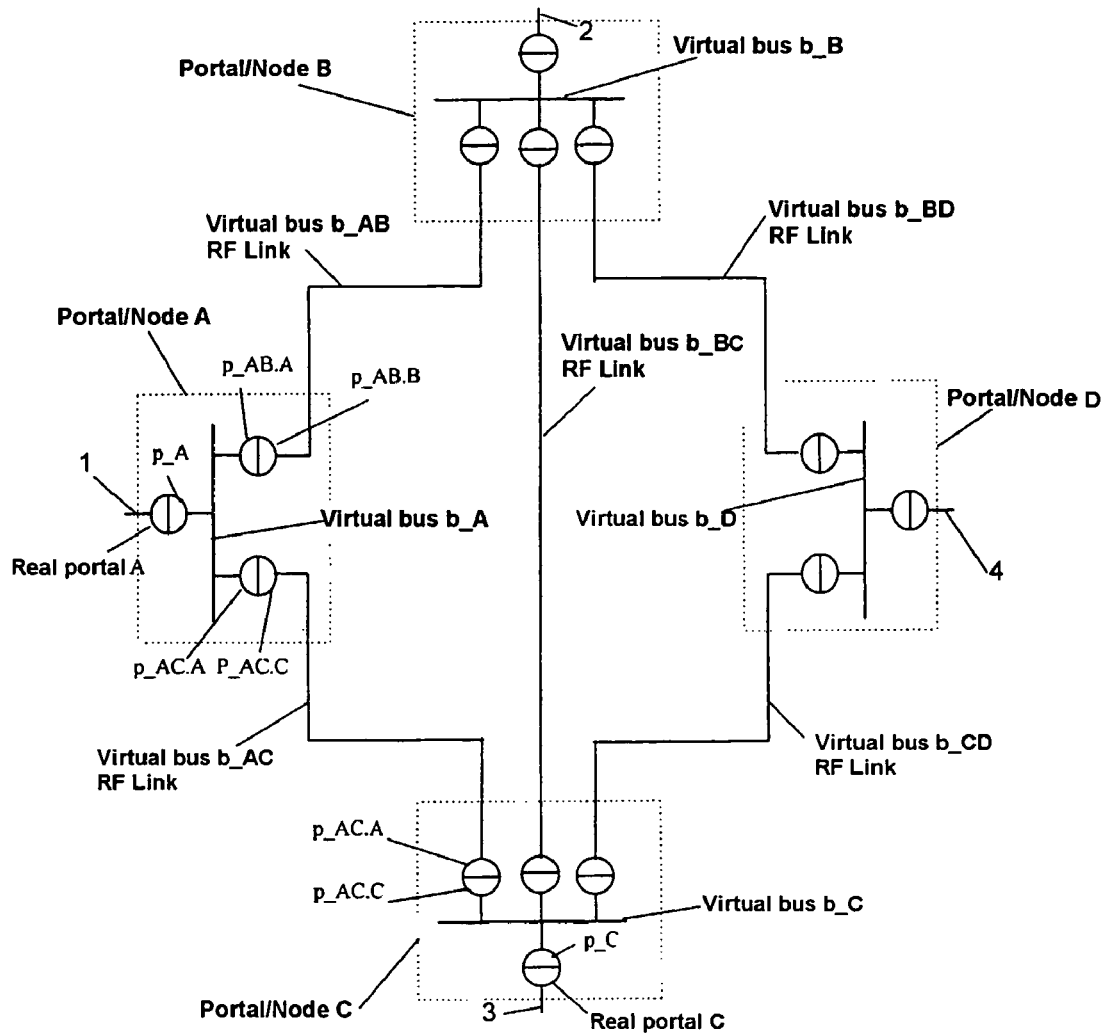
FIG. 2 is a diagram representing a modelling of the bridge of FIG. 1 by use of virtual buses according to a first exemplary embodiment.

Such a modelling in the case of the example of FIG. 1 is given by FIG. 2. The dots define the confines of the various nodes acting as portals. Here we shall distinguish between the concept of node, which encompasses the device itself, as well as the concept of portal, with reference to the prime function of the node. This distinction is made so as to clarify the description which will follow. Specifically, a node can simulate, for example in a software manner, virtual elements such as buses and virtual portals. The real portal (denoted A, B, C or D hereinbelow) of the node is then placed functionally at the same level as the virtual portals, although in reality it is this real portal itself which simulates the virtual elements.

Each node comprises a bridge linking its IEEE 1394 bus to an internal virtual bus. This bridge is composed of the real portal connected to the IEEE 1394 bus and of a virtual portal connected to the internal virtual bus.

Each node furthermore comprises a virtual bridge for each possible wireless link with another node. A wireless link is represented by a virtual bus. A virtual bridge comprises two virtual portals, connected respectively to the internal virtual bus of the node and to the virtual bus representing the wireless link.

The internal virtual buses differ from the virtual buses representing the wireless links by an important aspect as regards the reserving of resources: whereas a virtual bus representing a wireless link possesses a limited passband, this is not the case for the internal bus.

Generally, the following notation is adopted:

b_X Virtual bus of portal X b_XY Virtual bus between the portals X and Y that of the control windows of the other nodes. A node transmits its control information in the control window allocated to it, and repeats the information of the control windows of the other nodes. A repeated item of control information is identified as being repeated by the use of a repetition counter and which is, incremented each time the item of control information is repeated by a node. When a node A receives an item of control information of a node X in the control window of this node X, then the node A deduces therefrom that this information item reaches it directly from the node X. Conversely, if the node A receives the control information of the node X in a control window other than that of the node X, then this information item has been repeated and has not reached it directly. Thus, on the one hand, the control information is propagated to all the wireless nodes of the wireless bridge, even if the connectivity there is incomplete, on the other hand each node can determine whether the information which it receives originates directly from another node, or whether it has been repeated.

Within the framework of the present exemplary embodiment, each time a new node is plugged in, it issues a calibration request by inserting it into its control window. This request comprises a flag for each of the nodes of the wireless network. A flag of order j is set to the value 1 if the node issuing the request can receive node j, that is to say if a direct wireless link exists. This request is then propagated throughout the network using the aforesaid mechanism of the control windows. A node detecting a calibration request in a newly occupied control window also generates a calibration request.

At the end of calibration, that is to say once each node has issued its calibration request and it has been transmitted to all the other nodes, each node is aware of what are the direct wireless links in the wireless bridge. Each node can then proceed to the modelling and emulation of the buses and portals which relate to it, according to the rules which were set forth earlier.

As in the case of the IEEE 1394 1995 standard, a manager of isochronous resources is designated for each bus, although in the present case these are virtual buses and not real buses.

Two cases arise: the election of an isochronous resources manager for an internal virtual bus, and the election for a virtual bus representing a wireless link.

In each case, the designation of an isochronous resources manager apparatus can be made in various ways. The two methods described hereinbelow are given by way of example.

According to the present exemplary embodiment, the element elected manager of isochronous resources on an internal virtual bus is always the virtual portal of the bridge which also comprises the real portal of the node. If the node is the node X, the virtual portal elected for the internal virtual bus b_X is the portal p_X.

According to the present exemplary embodiment, the election of the manager of isochronous resources on a virtual bus representing a wireless link is made as follows:

(1) Each node A, B, C, D reads from a memory of the other nodes an identifier of the node called 'EUI64' in the 1394 1995 document. This identifier, unique to each apparatus, possesses a length of 64 bits.

(2) The order of the bits of the identifiers is inverted, that is to say the least significant bit takes the place of the most significant bit, the second least significant bit takes the place of the second most significant bit and so on.

(3) Each node determines for each wireless link the larger out of the inverted identifier of the node on the other side of the link and its own identifier. If the larger identifier is that of the node on the other side of the link, then the manager of isochronous resources of this link is the virtual portal p_XY.Y, where X designates the node performing the determination on its behalf and Y designates the node on the other side of the link. In the converse case, it is the portal p_XY.X which is designated.

Thus, the isochronous resources managers are designated unambiguously. The isochronous resources managers are also designated as roots of their buses, in the sense of the IEEE 1394 1995 standard. Each isochronous resources manager manages a register of availability of isochronous channels, which is similar to the 'CHANNEL_AVAILABLE' register described by the IEEE 1394 1995 document in section 8.3.2.3.8, and which is accessible in a similar manner. Access to this register, as well as to the register of availability of wireless passband will be seen in greater detail in conjunction with FIG. 4.

According to the present example, the nodes A, B, C and D furthermore elect a manager of the passband of the wireless bridge. Unlike the isochronous resources managers, the number of which depends on the number of possible wireless links, the function of manager of the isochronous passband is a function centralized at the level of a single device for the entire wireless bridge.

It is recalled that according to the IEEE 1394 1995 standard, the manager of isochronous resources of each bus manages both the passband availability register and the channels availability register.

Various methods can be used to determine unambiguously the passband manager from among the various elements of the network. According to the present exemplary embodiment, this task is entrusted to the real portal possessing the largest inverted node identifier. As previously, each node determines the passband manager by analysing the identifiers of all the nodes of the network.

The passband manager manages a wireless passband availability register similar to the passband availability register ('BANDWIDTH_AVAILABLE') defined in section 8.3.2.3.7 of the IEEE 1394 standard, and access to which by the various elements of the network is also similar. The register is initialized to a given value corresponding to the passband available on the wireless network, for example 32 Mbit/s.

A device connected to one of the real buses 1 to 4 must, to communicate with a device of another bus, configure the bridges and virtual and real buses which link it to the device of the other bus.

Figure 4:
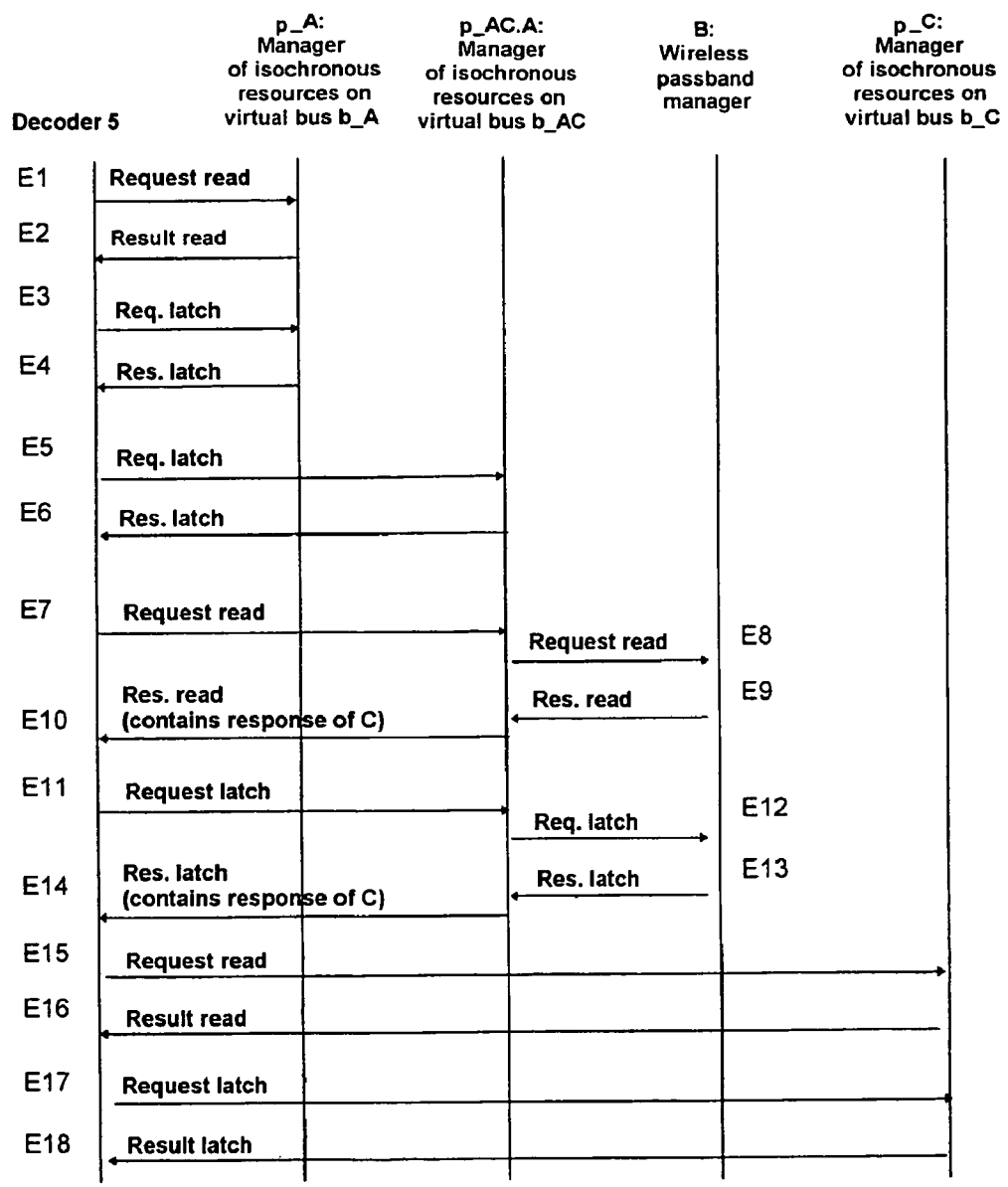
FIG. 4 is a time chart explaining the exchanges of messages between the elements of the network within the framework of a reservation of resources.

FIG. 4 illustrates the exchanges employed to perform a reservation of isochronous resources on the wireless bridge for the purpose of establishing a channel between a decoder 5 (see FIG. 1) connected to the IEEE 1394 bus 1 and decoder 6 connected to the IEEE 1394 bus 3.

The configuration process relating to the IEEE 1394 buses 1 and 3 is that defined by the IEEE 1394 1995 standard and will consequently not be tackled in detail.

For the requirements of the example, the real portal B has been elected passband manager of the wireless bridge. The virtual portals p_A, p_AC.A and p_C are respectively the managers of isochronous resources of the buses b_A, b_AC and b_C.

The decoder 5 must perform reservations of isochronous channels and of passband with the corresponding managers of the buses b_A, b_AC and b_C. It must also make a passband reservation with the portal B.

According to a first step (E1), the decoder 5 performs a request for reading the content of the register of availability of isochronous resources of the bus b_A. The address of the manager of isochronous resources of this bus is composed of the address bus and of a shift value ('offset') for the manager, and the value of which is determined by the IEEE 1394 1995 standard. The request is in fact recovered by the real portal A, which detects the address of the bus b_A in the request and determines whether the virtual portal p_A is emulated by itself or by another node. Given that the portal p_A is indeed emulated by the real portal A, the latter also emulates the manager of isochronous resources of the bus b_A, as well as the register of availability of isochronous resources of this bus. The content of this register is sent back (E2) to the decoder. The register identifies those out of the 64 channels which are used and those which are free, by the value of one bit per channel. To make the reservation of channels, the decoder 5 transmits a latching request (E3) which comprises the value previously read from the register, as well as a new value written thereto. This new value indicates, in addition to the channels already identified as reserved in the value read, these two channels which the decoder seeks to reserve. The portal p_A compares the old value with that contained in its register of availability of isochronous resources. If this value is identical, the portal writes the new value into the register and indicates to the decoder that the reservation is made. It is assumed that this is the case in the example of FIG. 3 (step E4). If the two values are not identical, then the content of the register has been modified by another apparatus between the moment of the reading thereof and of the latching request by the decoder 5. The content of the register is then not modified. The decoder 5 is informed thereof, and may possibly perform a new attempt at reservation. This register is initialized to the same value as that of the real bus to which the real portal A (for example) is connected.

A passband availability register is implemented also at the level of a virtual bus without passband limitation. Should passband be reserved at the level of such a bus, the content of the register is decremented accordingly. The advantage of emulating this behaviour is that it satisfies the bus management advocated by the IEEE 1394 1995 document. Within the framework of the present example, the decoder 5 will also attempt to make requests for reading and for latching a passband availability register with a passband manager of the bus A.

The decoder 5 then reserves in the same way the isochronous channels on the bus b_AB, by addressing a reading request to the manager of isochronous resources of this bus, then a request for latching with the portal p_AC.A (steps E5 and E6).

To comply with the IEEE 1394 1995 standard, a device seeking to reserve passband on a virtual bus addresses itself to the manager of isochronous resources of this virtual bus, as if it were a real bus. This is the case even if the manager of the isochronous resources is not the manager of the passband of the wireless bridge. Nevertheless, the manager of isochronous resources knows the address of the passband manager of the wireless bridge, and transmits the request of the initial device by means of this address to the real portal which emulates this function. The manager of isochronous resources also recovers the response to the request on the part of the wireless passband manager, and transmits it to the device. As far as the latter is concerned, everything therefore takes place as if it were making a reservation on a real bus. The centralizing of the passband manager functionality on the wireless bridge is therefore transparent at reservation level.

Figure 3:
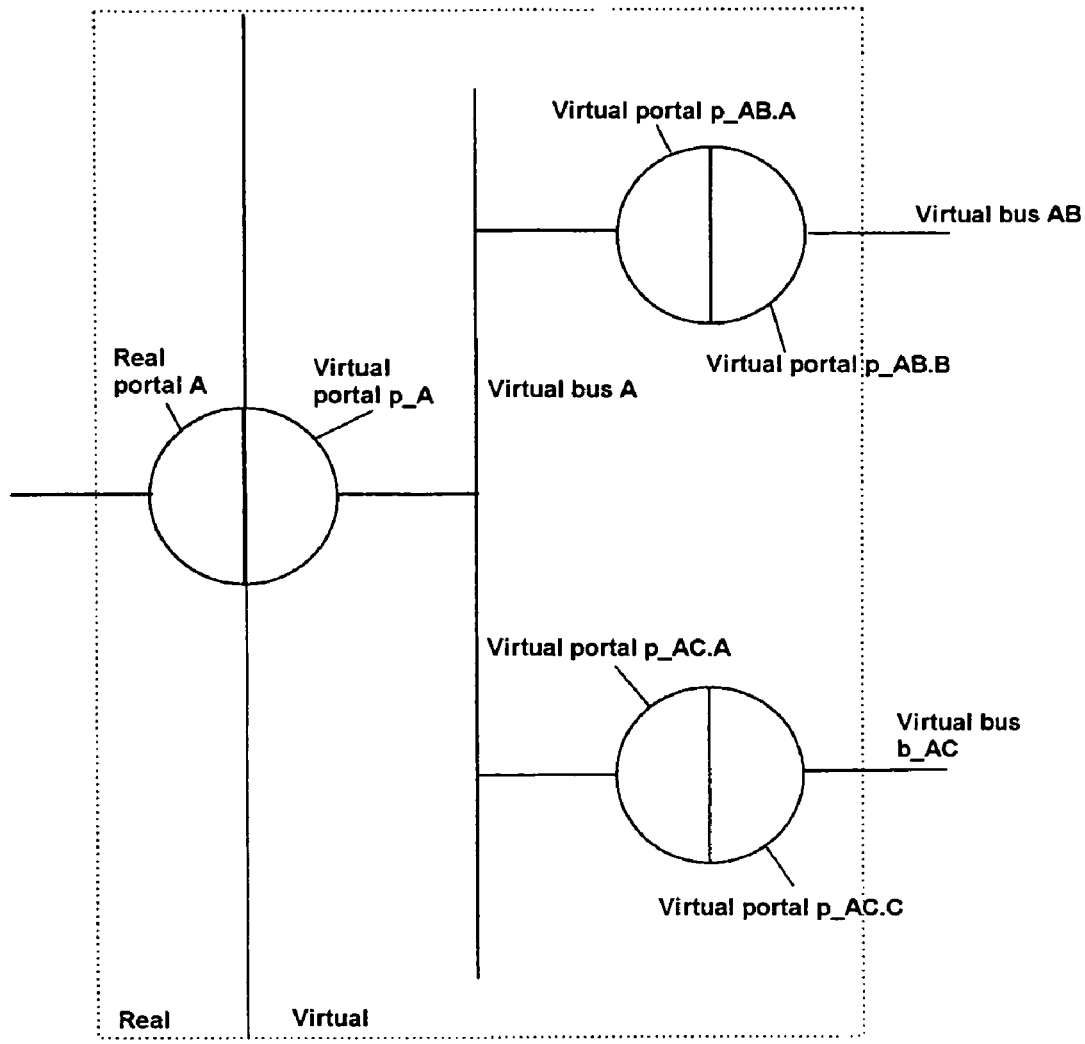
FIG. 3 is a diagram representing the real and virtual elements of the node A of FIG. 2.

In the case of the example of FIG. 3, to reserve the passband required on the virtual bus b_AC (which is passband limited), the decoder 5 issues a reading request (E7) for the passband register of the wireless network with the portal p_AC.A, which transmits (E8) the request to the portal C. The latter transmits its response (E9) again to the portal p_AC.A, which retransmits to the decoder 5 (E10).

The procedure is similar for the latching/writing request (steps E11 to E14).

Lastly, the reservation of isochronous channel on the internal virtual bus b_C is made with the portal p_C (steps E15 to E18), in the same way as for the reservation on the internal virtual bus b_A.

In the case where an isochronous connection comprises several wireless links, the wireless bridge passband availability register is decremented as many times as necessary, as and when reservations are made.

The reservation of the resources required for transmission has thus been made.

The reservation process just described makes it possible, as already mentioned, to incorporate a wireless bridge into a network of buses, whilst preserving the mechanisms for managing the buses defined by the IEEE 1394 1995 standard and the standards to which it refers, in particular as regards access and management of addresses and registers. What has just been described therefore relates to the view of the wireless bridge seen by an apparatus seeking to communicate with an apparatus on the other side of this bridge. The real operation of the wireless bridge is different. Although the latter simulates several buses, and in particular their managers of isochronous resources and of passband, the resource reservations are not really made other than to the extent that they correspond to the actual operation of the wireless bridge, which has a role of adapting these reservations to its own operation. Within the framework of the present exemplary embodiment, passband is actually reserved in the manner indicated. The isochronous channels reservation made on its virtual buses therefore has no real significance in respect of the wireless bridge, since a TDMA type mechanism, described in the French patent application already cited, is used by the wireless bridge to transmit data, a mechanism which differs from that implemented on an IEEE 1394 bus. To an isochronous channel transmitted on a real bus, and which has to be transmitted on the wireless network, there corresponds a wireless isochronous channel. This wireless isochronous channel corresponds to a definite constant number of isochronous packets transmitted at each wireless frame. The isochronous packets may be transmitted on the wireless medium in the same format as on an IEEE 1394 bus. The wireless isochronous channel is then defined by the association of the identity of the sender wireless node and of the channel number used on the IEEE 1394 real bus to which the wireless transmitter is connected.

Figure 7:
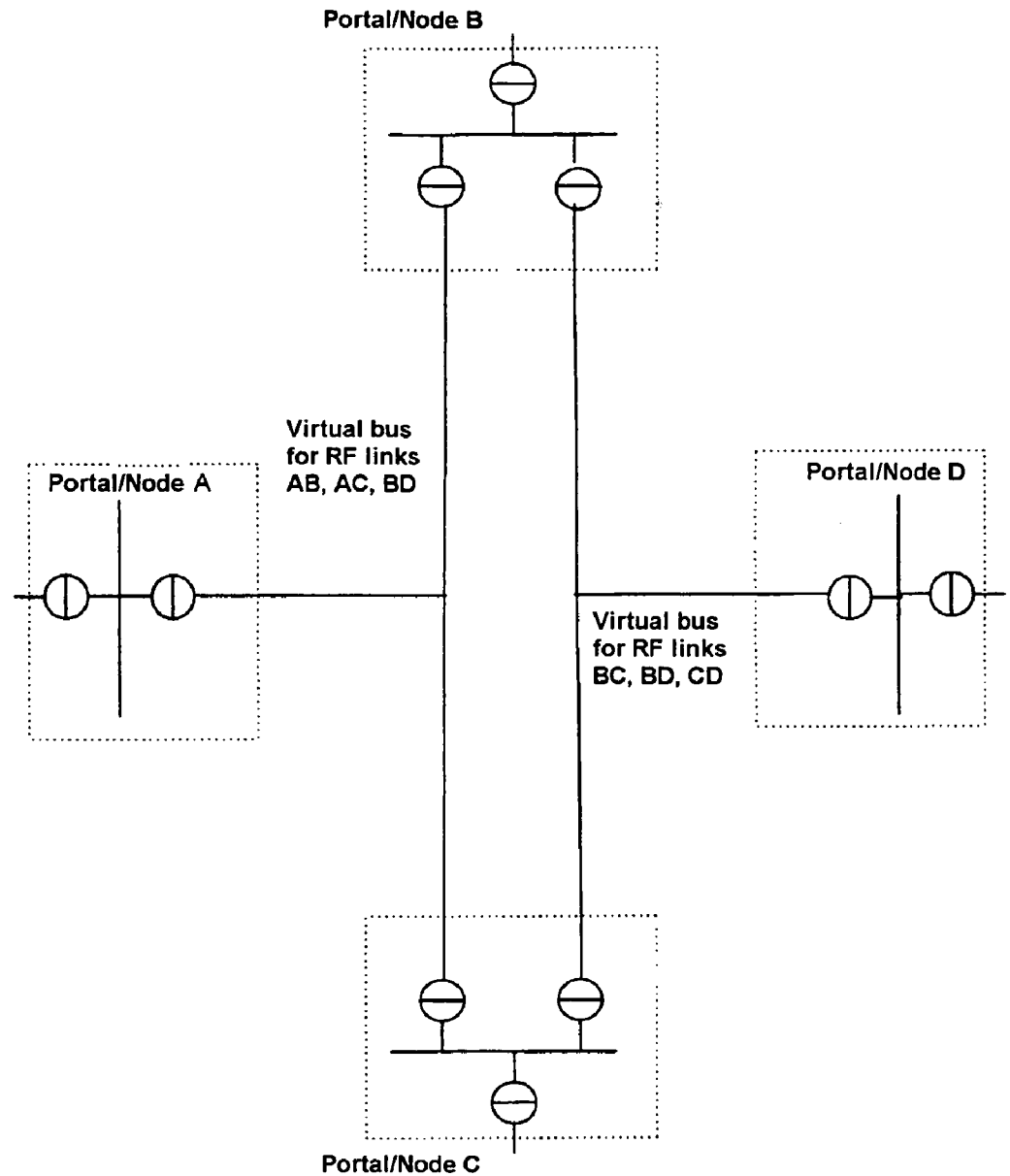
FIG. 7 is a simplification of the modelling according to a first variant of the first exemplary embodiment.

A first variant embodiment of the first example is illustrated by the diagram of FIG. 7. This variant makes it possible to simplify the virtual models, and is preferably implemented within the framework of stable wireless bridges, that is to say ones whose wireless links are not modified or modified at relatively large time intervals. Specifically, in the event of incomplete connectivity, these simplified models require that the connectivity of the wireless bridge be completely recalculated with each topological modification of the network of buses.

According to the said simplification, subsets of links are determined. Each wireless node forming part of a link of a subset is linked directly with every other node of this subset. The nodes of a subset are then linked by a virtual bus, this amounting to modelling the set of links between the nodes of a subset by a single virtual bus.

The wireless bridge in the configuration of FIG. 1 gives rise to a new model illustrated by FIG. 7, with the two groups of links AB, AC, BD and BC, BD, CD.

Figure 9A:
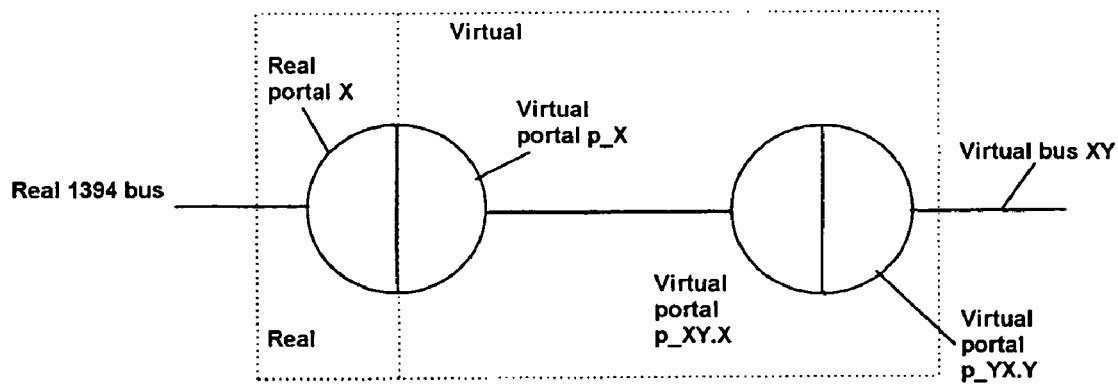
FIG. 9a is a diagram representing a modelling of a particular example of a bond between two nodes, according to the first exemplary embodiment.
Figure 9B:
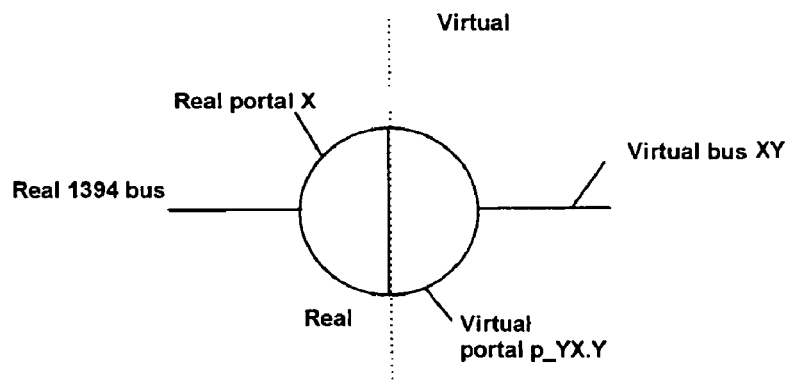
FIG. 9b is a diagram representing a simplification of the modelling of FIG. 9a according to a second variant of the first exemplary embodiment.

A second variant of the first exemplary embodiment consists in eliminating from the model of the first exemplary embodiment the internal virtual bus of a node X which possesses a single link, to another node Y. FIG. 9a illustrates such a case. The virtual portals connected to this virtual bus are also eliminated. This wireless link is replaced by a bridge made up of the real portal X of the node X and of a virtual portal p_YX.Y managed by the node Y, these two portals being the remaining portals of the two bridges of the eliminated virtual bus. The model has thus been contracted. The remaining semi-virtual bridge thus constituted is illustrated in FIG. 9b.

Figure 8:
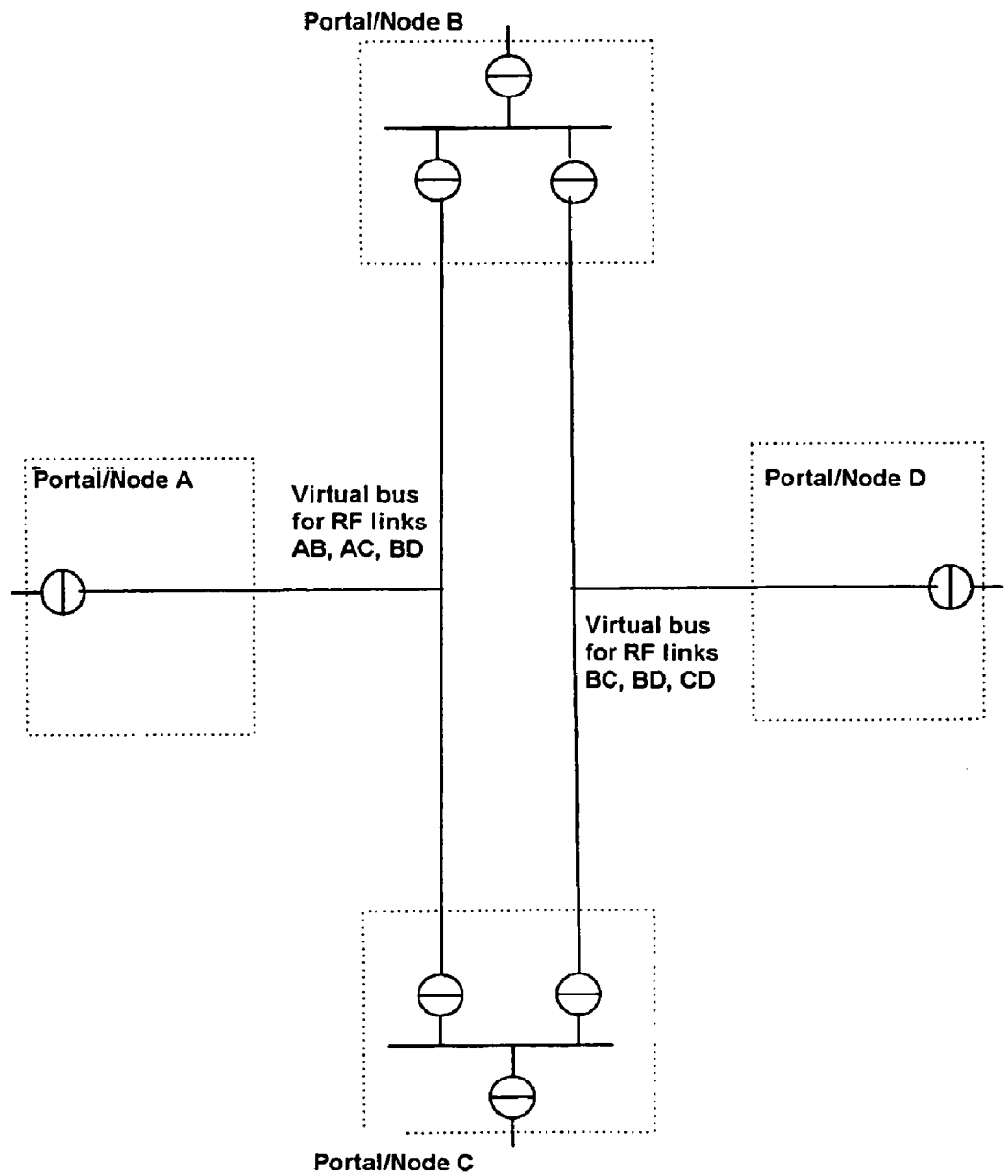
FIG. 8 is an additional simplification of the modelling of FIG. 7 according to a second variant of the first exemplary embodiment.

The application of this variant to the example of FIG. 7 results in the simplified model of FIG. 8.

According to a second exemplary embodiment, a decomposition of a multi-portal bridge into a given number of bi-portal bridges is carried out by representing a wireless link by a virtual bridge. It is recalled that according to the first exemplary embodiment, a wireless link was represented by a bus.

Figure 5:
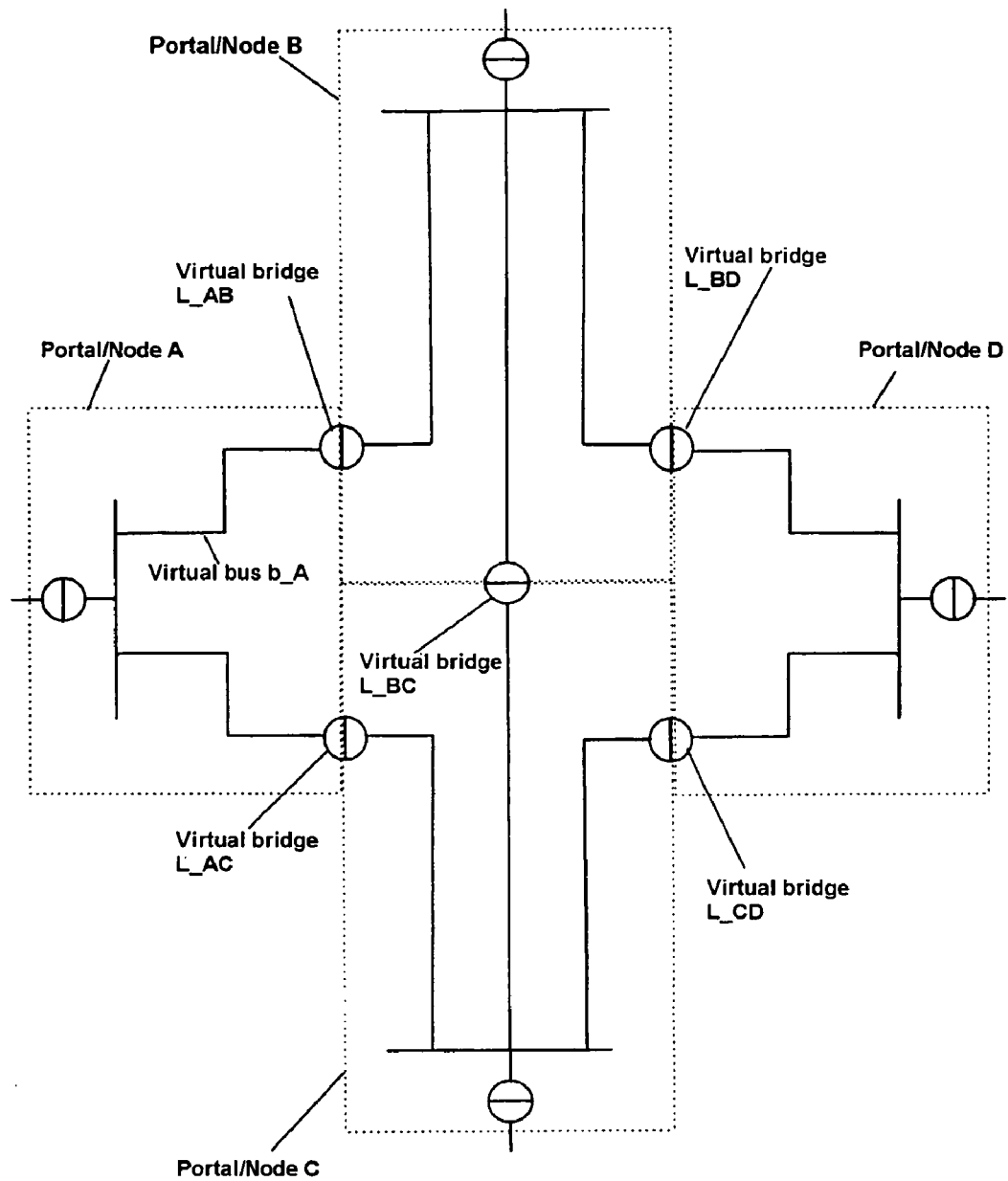
FIG. 5 represents a modelling of the bridge of FIG. 1 by use of virtual bi-portal bridges according to a second exemplary embodiment.
Figure 6:
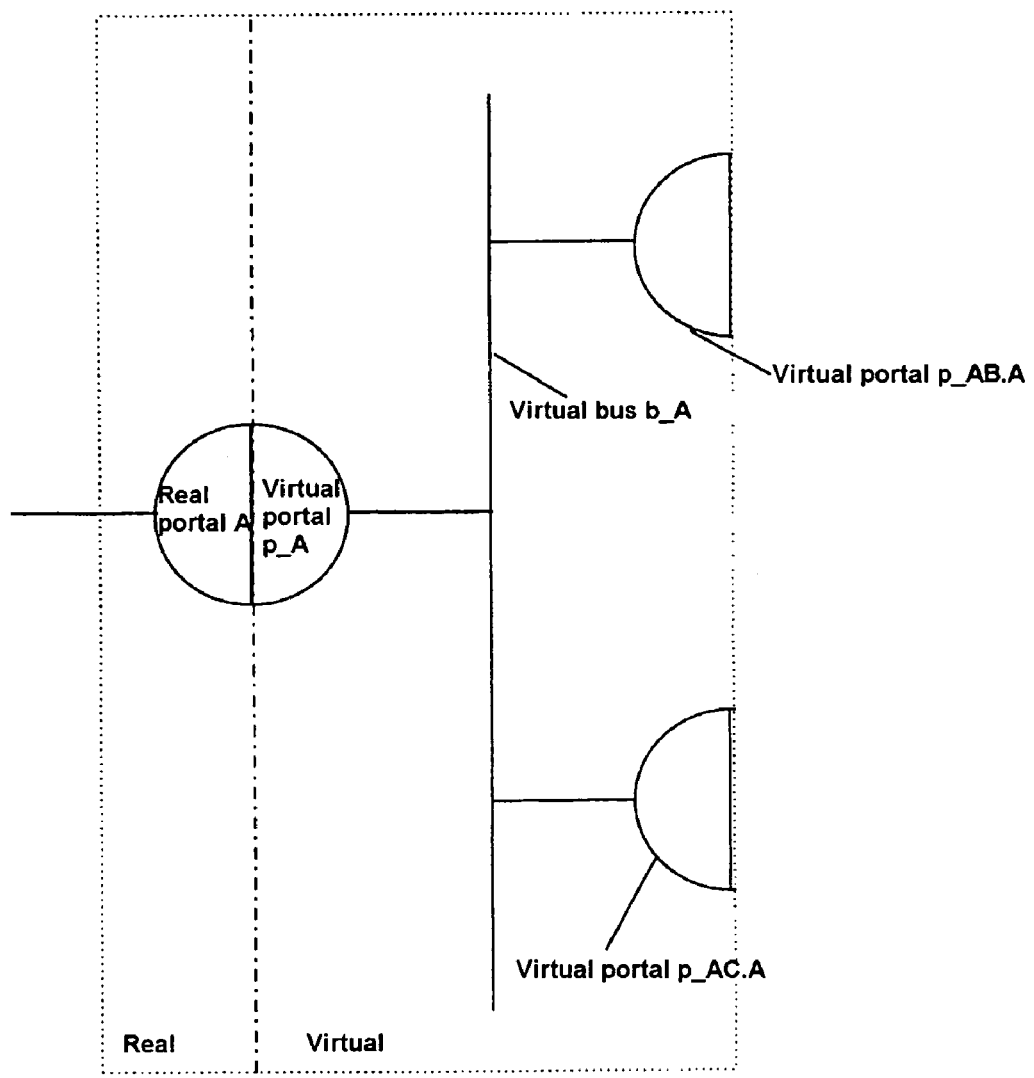
FIG. 6 is a diagram representing the real and virtual elements of the node A of FIG. 5.

FIGS. 5 and 6 make it possible to describe this modelling. The dotted lines of FIG. 5 indicate the limits of each of the nodes A, B, C, D. The real and virtual elements situated within the limits of a node are managed by the latter. FIG. 6 represents the node A and comprises the complete references for each of its elements. These references have not all been plotted in FIG. 5 for reasons of clarity.

The modelling is carried out as follows:

Each node comprises a bridge linking its IEEE 1394 bus to an internal virtual bus (b_A, b_B, . . . ). This bridge is made up of the real portal connected to the IEEE 1394 bus and of a virtual portal connected to the internal virtual bus. As previously, these portals are denoted respectively X and p_X, where X represents one of the nodes A to D.

Each node X furthermore comprises a virtual portal for each possible wireless link with the other nodes of the wireless network (it is recalled that according to the first exemplary embodiment, each node comprised a virtual bridge for each wireless link and not simply a portal). These portals are denoted p_XY.X, where Y takes in the present case the values B, respectively C, this corresponding to the nodes in direct wireless communication with the node A. Two virtual portals corresponding to the same wireless link between two nodes form a virtual bridge (denoted L_XY, made up of portals p_XY.X and p_XY.Y), this virtual bridge representing the wireless link.

It will be noted that in the case of this second example, the two virtual portals of a virtual bridge are managed by distinct nodes, unlike what was the case in the first exemplary embodiment. It will also be noted that the number of virtual buses and of virtual bridges is reduced with respect to the first exemplary embodiment.

When a controller (for example the decoder 5) wishes to establish an isochronous connection through a network of buses, it can either configure all the buses and the bridges of the path (as described in the previous example), or else despatch a command to the first bridge of the path, then leaving the latter to configure its local bus, and despatch a command to the next bridge of the path.

In the first alternative, the initial controller has complete leeway in selecting a path (from among other possible paths). In the second approach on the other hand, the controller must subcontract choice of path to the various bridges of the path, each bridge being responsible for finding the next bridge of the path.

The second approach (command approach) is further indicated within the framework of the model based on virtual bridges. Specifically, in this case there is no direct correspondence between a virtual bus and a wireless link, but a direct correspondence between a virtual bridge and a wireless link.

The method of reserving passband described previously does not therefore apply and the following method of reservation is used:

When a controller wishes to establish an isochronous connection between two nodes of the network of buses, it selects from among all the bridges connected by an IEEE 1394 bus to one of the nodes, for example the source node, the bridge which is most indicated for supporting the isochronous connection (for example the one closest to the destination or the least busy, etc.). The controller then generates a command requesting establishment of an isochronous connection to this bridge, and specifies as parameters the address of the destination node (parameters 'bus_ID' and 'node_ID' within the meaning of the IEEE 1394 1995 document), the passband required, and the isochronous channel number used on the local bus (the bus linking the source node and the first bridge). This first bridge makes the reservations necessary on its local virtual bus (channel number, and passband). It then seeks the next bridge most indicated for the requested destination, and despatches it the same command, and so on and so forth up to the last bridge. If for any reason a bridge cannot follow up a command to establish an isochronous connection (lack of resources on the local bus, etc.), it responds negatively to the command. If the resources are available along the path, the command will reach the last bridge, which will respond favourably. The favourable responses are thus relayed gradually up to the initiating controller, which interrupts this response as an indication that the connection is established.

The principle specific to wireless communication is that each time that a virtual bridge corresponding to a wireless link is traversed, the passband must be reserved with the single manager of the isochronous resources of the wireless network.

If we return to the previous example (FIG. 1) of the decoder 5 desiring to establish an isochronous connection between itself and the decoder 6, the following steps are implemented:

1—The decoder 5 reserves a channel number (Y) and the passband (X) on its local IEEE 1394 bus (bus 1).

2—The decoder 5 despatches a command for establishing a connection to the portal A, with the following parameters: (destination: decoder 6, passband X, channel number: Y).

3—The portal A seeks the best path for reaching the decoder 6, it chooses for example to pass through the bridge L_AC.

4—The portal A reserves the channel Y (or by default, another channel), performs the translation of a corresponding header on this channel and reserves the passband X on the virtual bus b_A. The portal A then despatches the command for establishing a connection to the virtual bridge L_AC. The header modification may be rendered necessary by the fact that when a bridge desires to pass an isochronous channel from one bus to another, it may happen that the channel number used on the first bus is already reserved on the second bus. In this case, the bridge must use another channel number on the second bus, and undertake the change of channel number at the level of each isochronous packet of this channel when it passes from the first bus to the second bus.

5—The virtual bridge L_AC makes the passband reservation with the manager of the isochronous resources of the wireless network (here portal B) according to the principle previously set forth (reading of the content of the register, followed by latching). If it has been possible to make the reservation, the procedure continues. Otherwise, the virtual portal L_AC.A responds negatively to the portal A, which responds negatively to the decoder 5.

6—If it was possible to make the passband reservation, the portal L_AC.A makes the reservations on the bus b_C in the same manner as in point 4, then despatches the command to the last bridge (comprising the real portal C and virtual portal p_C).

7—The last bridge makes the channel and passband reservations on the real bus (bus 3) to which the destination node is connected. If it was possible to make the reservations (the resources having been available), it responds favourably to the portal L_AC.A, which responds favourably to the portal A, which responds favourably to the decoder 5. Otherwise the response is negative.

In the case of an isochronous connection requiring transmissions through several wireless links, each bridge L_WZ crossed reserves passband with the single manager of the isochronous resources of the wireless network, thus ensuring consistent management of the wireless resources.

Figure 10A:
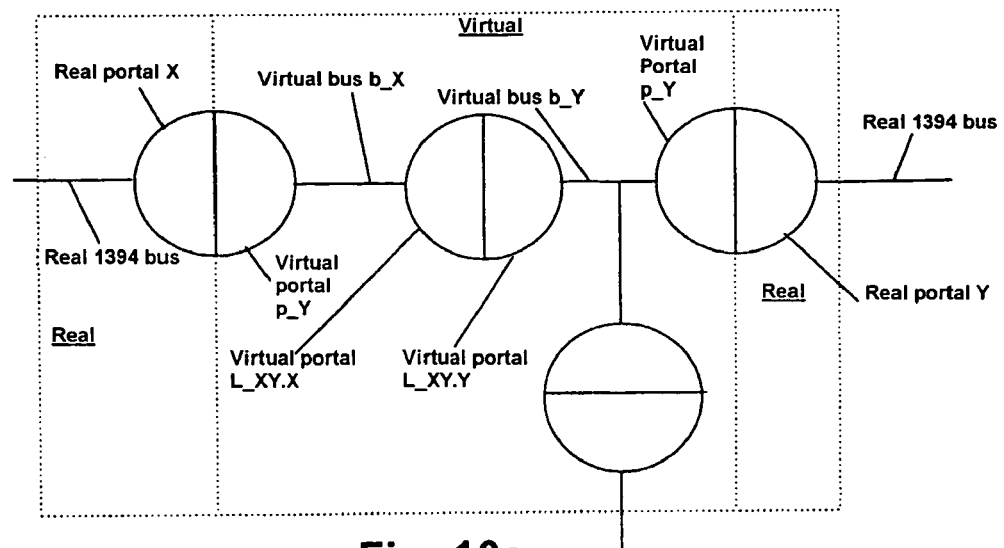
FIG. 10a is a diagram representing a modelling of a particular example of a bond between two nodes according to the second exemplary embodiment.
Figure 10B:
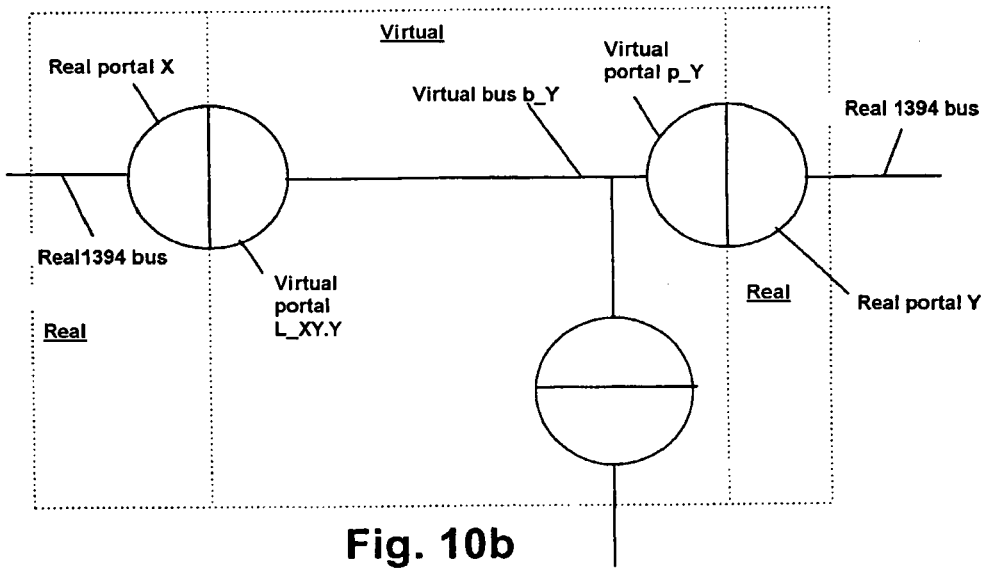
FIG. 10b is a diagram representing a simplification of the modelling according to a variant of the second exemplary embodiment.

According to a variant embodiment of the second exemplary embodiment, the internal virtual bus of a node X which possesses a single wireless link to another node Y is eliminated, as in the case of the second variant of the first exemplary embodiment. Also eliminated are the two virtual portals connected to this bus. By contraction, a semi-virtual portal is formed, made up of the real portal X and of the virtual portal L_XY.Y. FIGS. 10a and 10b represent one and the same model before and after this simplification respectively.

In the case illustrated by FIGS. 10a and 10b, the node Y forms part of two wireless links. Were the node Y to form part solely of the wireless link XY, then by applying the present simplification, the diagram of FIG. 10b would reduce to a bridge linking two real buses and made up of the real portal X and of the real portal Y.

According to the present variant, this wireless link is replaced by a bridge made up of the real portal X of the node X and of a virtual portal p_YX.Y managed by the node Y. This semi-virtual bridge is illustrated in FIG. 9. It should be noted that the example of FIG. 1 includes no node forming part of only one wireless link.

The invention claimed is:

1. A method for managing isochronous resources in a communication network comprising at least two communication buses linked by way of a wireless transmission bridge, the bridge comprising for each bus a real portal connected to its respective bus, each portal being furnished with wireless communication means, wherein the method comprises the steps of:

modeling the wireless bridge by each real portal in the form of virtual buses and virtual portals, so that the modeled wireless bridge comprises only virtual bridges with a maximum of two virtual portals;

emulating a global register of passband availability for the set of wireless links of the wireless bridge;

reserving passband with the global register for the virtual buses representing each wireless link participating in a communication between two real portals.

2. The method according to claim 1, wherein a wireless link is modeled in the form of a virtual bridge.

3. The method according to claim 1, wherein a wireless link is modeled in the form of a virtual bus.

4. The method according to claim 1, wherein a group of wireless links linking a group of portals having complete connectivity is modeled in the form of a single virtual bus.

5. The method according to claim 3, wherein each real portal emulates;

a virtual portal forming together with the real portal a bridge linking the communication bus connected to the real portal to a virtual so-called internal bus also emulated by the real portal;

a virtual bridge for each wireless link with another real portal.

6. The method according to claim 2, wherein each real portal emulates:

a virtual portal forming together with the real portal a bridge linking the communication bus connected to the real portal to a virtual so-called internal bus also emulated by the real portal;

a virtual portal for each wireless link with other portals of the wireless bridge, two virtual portals corresponding to the same wireless link between two real portals forming a virtual bridge representing the wireless link.

7. The method according to claim 4, further comprising the step of eliminating an internal bus and virtual portals connected thereto, and of contracting into a bridge the two orphan portals thus created, in the case where the real portal comprising the internal bus forms part of a single wireless link.

8. The method according to claim 1, further comprising the step of determining, by each real portal, the set of wireless links between the real portals.

9. The method according to claim 8, wherein the step of determining the set of wireless links comprises the steps of:

identifying, by each real portal, the other real portals whose data reach it directly;

transmission destined for all the other real portals of the wireless network, of the list of real portals with which a direct link exists;

reception of the list compiled by each of the other portals.

10. The method according to claim 1, further comprising the step of emulating a register of availability of isochronous channels for each virtual bus.

11. The method according to claim 1, wherein the step of reserving passband with the global register comprises the sending of a request for reserving passband to a manager of isochronous resources of a virtual bus and for transmitting the request by the said manager of isochronous resources of the virtual bus to a software module managing the global register of passband availability.

12. The method according to claim 1, wherein the bridge comprises at least three portals.

13. A method for managing isochronous resources in a communication network comprising more than two communication buses linked by way of a wireless transmission bridge, the bridge comprising for each bus a portal connected to this bus, said wireless bridge being modelized by each portal in the form of virtual buses and virtual portals, so that the modeled wireless bridge comprises only virtual bridges with a maximum of two virtual portals, each portal being provided with wireless communication means, the method comprising the steps of:

providing a global register of passband availability for the set of wireless links of the wireless bridge;

reserving passband with the global register for the virtual buses representing each wireless link participating in a communication between two portals.

* * * * *